(12) United States Patent
Linden

(10) Patent No.: US 6,622,007 B2
(45) Date of Patent: Sep. 16, 2003

(54) DATACAST BANDWIDTH IN WIRELESS BROADCAST SYSTEM

(75) Inventor: Thomas M. Linden, Los Gatos, CA (US)

(73) Assignee: Command Audio Corporation, Redwood City, CA (US)

( * ) Notice: Subject to any disclaimer, the term of this patent is extended or adjusted under 35 U.S.C. 154(b) by 181 days.

(21) Appl. No.: 09/777,503

(22) Filed: Feb. 5, 2001

(65) Prior Publication Data

US 2002/0106987 A1 Aug. 8, 2002

(51) Int. Cl.[7] .............................. H04Q 7/20; H04Q 7/38
(52) U.S. Cl. .................... 455/12.1; 455/3.01; 455/3.02; 455/427; 455/13.1; 455/3.06; 725/109
(58) Field of Search .............................. 455/3.01, 3.02, 455/3.03, 424, 425, 427, 428, 12.1, 13.1, 13.3, 3.06, 445, 517, 422, 403; 725/109

(56) References Cited

U.S. PATENT DOCUMENTS

| | | | | |
|---|---|---|---|---|
| 5,283,639 A | * | 2/1994 | Esch et al. .................. | 455/3.01 |
| 5,483,277 A | * | 1/1996 | Granger ...................... | 455/3.01 |
| 5,592,471 A | * | 1/1997 | Briskman ................... | 455/3.02 |
| 5,603,077 A | * | 2/1997 | Muckle et al. .............. | 455/3.02 |
| 5,655,217 A | * | 8/1997 | Lemson ...................... | 455/445 |
| 5,732,324 A | | 3/1998 | Rieger, III | |
| 5,801,785 A | * | 9/1998 | Crump et al. ............... | 725/109 |
| 5,852,612 A | * | 12/1998 | Kostreski et al. ........... | 455/3.02 |
| 5,956,624 A | | 9/1999 | Hunsinger et al. ........... | 455/65 |
| 5,991,596 A | | 11/1999 | Cunningham et al. | |
| 6,463,585 B1 | * | 10/2002 | Hendricks et al. .......... | 725/109 |

OTHER PUBLICATIONS

Kroeger, Brian W. and Peyla, Paul J., "IBOC DAB AM and FM Technology", Westinghouse Wireless Solutions Co., http://www.usadr.com/Technical/tech_ibocdab.html (Oct. 27, 1998).

* cited by examiner

Primary Examiner—William Trost
Assistant Examiner—Keith Ferguson
(74) Attorney, Agent, or Firm—Morrison & Foerster LLP

(57) ABSTRACT

A network datacast system includes a plurality of transmission facilities. Each transmission facility receives primary programs from one or more media studios. Each transmission facility also receives ancillary data programs from a network datacast center. Each transmission facility broadcasts a wireless signal that includes a primary channel and at least one ancillary data channel. The transmission facilities contemporaneously transmit the ancillary programs on the ancillary data channels. A network datacast receiver contemporaneously receives the wireless signals and extracts the datacast programs from each datacast signal. The extracted datacast programs are stored in the receiver for subsequent output to the user.

23 Claims, 8 Drawing Sheets

DATACAST BANDWIDTH IN WIRELESS BROADCAST SYSTEM

BACKGROUND

1. Field of Invention

The present invention relates to wireless datacast systems, and in particular to wireless datacast systems having multiple wireless datacast channels.

2. Related Art

Existing terrestrial AM and FM commercial radio (wireless) stations are converting from real-time analog to real-time digital radio signal formats (digital audio broadcasting (DAB)). In the United States, commercial broadcasters are adopting the In-band On-Channel system (IBOC), currently developed as iDABT™ by the iBiquity Digital Corporation, Columbia, Md., for DAB conversion. The IBOC system allows commercial broadcasters to retain their present government-licensed frequency spectrum allocation during the DAB transition.

IBOC systems are known and may be either all digital or hybrid. In the hybrid IBOC system, commercial broadcasters use a portion of their licensed frequency spectrum for the traditional analog radio signal transmission (e.g., AM or FM radio signal) of a primary (real-time) program while contemporaneously transmitting a DAB version of the primary program in upper and lower sideband areas of the analog carrier within the station's allocated spectrum. This contemporaneous analog and digital program transmission allows listeners to continue to use existing receivers during the industry transition to all digital broadcasting. Hybrid IBOC receivers tuned to a Hybrid IBOC station extract program information from the digital signal, if available. If the digital signal becomes unavailable (e.g., blocked by an obstacle) the receiver senses the digital signal loss and begins to extract the program information from the analog signal. The Hybrid IBOC is intended as an intermediate stage in the transition to all digital IBOC.

In DAB, each broadcast channel is typically divided into a primary channel and at least one ancillary data channel. DAB transmission of the primary program (via a primary channel) typically requires less bandwidth than is available in the sideband spectrum areas of a particular station's broadcast channel. Therefore, unused portions of the digital broadcast spectrum are allocated for datacast transmission (via an ancillary data channel). Datacasting is the transmission of information (e.g., audio, video, text, financial data, paging information) in an ancillary data channel having a bandwidth too narrow to support broadcast of a second primary, real-time, DAB program broadcast within the station's spectrum allocated by government regulation (station's broadcast channel).

The available datacast channel bandwidth depends on the bandwidth required for the associated main program DAB broadcast. If a commercial broadcaster desires "CD-like" audio quality (i.e., relatively high audio fidelity), more DAB bandwidth is required with a consequent decrease in available datacast bandwidth. If a commercial broadcaster requires relatively less audio fidelity (e.g., for a talk radio program) for a primary channel there is a consequent increase in available ancillary data channel bandwidth. For example, the maximum net digital capacity on a United States commercial FM station supported by the Hybrid IBOC design for FM broadcast systems is 144 kilobits per second (144 kbps=18 kilobytes per second or 18 KBps). A station transmitting high quality audio might reserve 96 kbps for audio and reserve 48 kbps (6 KBps) for data services (datacasting). A station with lower audio quality requirements (e.g., for talk format program) may set the digital audio (primary channel) capacity at 64 kbps and the ancillary data channel capacity at 80 kbps (10 KBps). These are maximum data rates and do not include overhead information requirements such as forward error correction (FEC) (e.g., Reed-Solomon encoding). Under some Hybrid IBOC designs, for example, FEC requires 24 kbps for each side band.

In addition to AM and FM commercial stations, digital radio signal transmission is used for other commercial broadcast systems. For example, digital television broadcast systems are being deployed in the United States and in Europe. Satellite digital audio radio (SDAR) systems, such as proprietary systems developed by Sirius Satellite Radio Inc., New York, N.Y., and by XM Satellite Radio Inc., Washington, D.C., are being developed and introduced. All digital radio signal broadcast systems have excess bandwidth capacity in each station's channel that may be allocated for datacasting.

Existing analog AM and FM commercial stations support datacasting in subcarriers of the main analog program carrier signal. This datacasting capacity is used to support information delivery systems such as the on-demand information system developed by Command Audio Corporation, Redwood City, Calif. The portable receiver in this illustrative on-demand system stores received programs for later output (playback) to the user. In the Command Audio Corporation system, the net data rate after convolutional encoding and FEC is 8.2 kbps.

A disadvantage of both existing analog and digital radio broadcast systems is that the ancillary data channel capacity, typically in a single ancillary data channel controlled by a unique commercial broadcast entity, is limited. Thus, some information delivery systems that require or can use additional datacast capacity are not possible. What is required is a way to provide increased data carrying capacity for information delivery systems within the constraints imposed by existing and future digital broadcast systems.

SUMMARY

A network datacast system includes a plurality of transmission facilities, each transmission facility broadcasting a unique wireless signal in one or more channels. Each channel is allocated bandwidth for primary programs (primary channel) and for ancillary datacast programs (ancillary data channel). Each transmission facility in the network receives primary programs from one or more media studios. Each transmission facility also receives ancillary programs from a network datacast center. The transmission facilities contemporaneously broadcast the received ancillary programs in the ancillary data channel portions of the broadcast channels.

A network datacast receiver receives the wireless signals from the transmission facilities and contemporaneously extracts the ancillary programs from the received signals. The receiver subsequently stores the received ancillary programs for output to the user at the user's request.

DETAILED DESCRIPTION

Like numbered elements represent the same element or similar elements among the several drawings. Persons familiar with radio transmitting and receiving systems will understand that several conventional components have been omitted from the drawings so as to more clearly illustrate embodiments of the invention.

Figure 1:
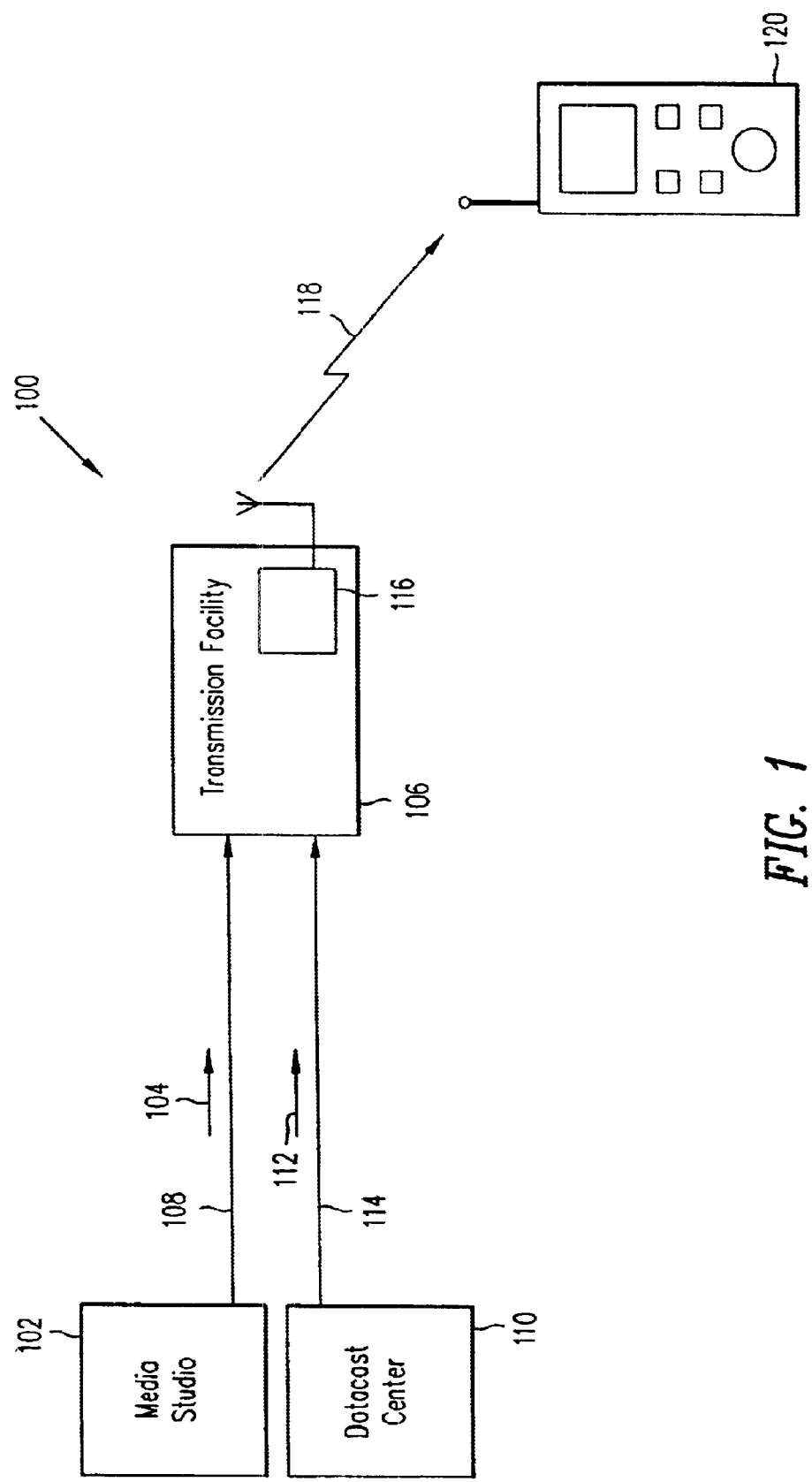
FIG. 1 is a diagrammatic illustration of a conventional broadcast system.

FIG. 1 is a diagrammatic illustration of a conventional broadcast system 100. An example of such a system is marketed by Command Audio Corporation. System 100 supports a broadcast signal transmission which provides a primary (real-time) program in a selected medium (e.g., audio or video). The primary program is broadcast in a primary channel. System 100 also supports the transmission of an ancillary program (datacasting). The ancillary program is broadcast contemporaneously with the primary program and in a channel carrying ancillary data (ancillary data channel or "datacasting" channel) Both the primary and ancillary data channels are within the broadcast entity's allocated spectrum (station's broadcast channel).

Media studio 102 provides primary programs 104 to transmission facility 106, typically via leased conventional telecommunication link 108. Programs 104 are typically in a digital format such as MPEG Layer 2 (musicam) used by the Eureka-147 digital audio broadcast system or Perceptual Audio Coder (PAC™) compression technology used by the iBiquity, Inc. IBOC system. The SDAR systems typically allow broadcast of multiple primary programs within their FCC allocated spectra (each satellite system typically includes several broadcast channels). XM Satellite Radio Inc., for example, currently advertises that its system will contemporaneously support broadcast of up to 50 music and 50 talk radio format primary channels, in addition to datacasting. Sirius Satellite Radio Inc. makes similar claims. Embodiments of the invention allow the aggregation of the data carrying capacity of the ancillary data channels of these illustrative SDAR systems which are otherwise independent.

Datacast center 110 provides ancillary programs 112 to transmission facility 106, again typically via leased conventional telecommunication link 114. Ancillary programs are discrete media "objects" such as stock ticker information, audio news programs, video news programs, advertising programs, text email between two entities, paging messages, etc.

Transmission facility 106 conventionally encodes programs 104 and 114 (optionally including features such as forward error correction, compression, and convolutional encoding). Transmission facility 106 includes conventional radio transmitter 116 which modulates the programs according to a designated broadcast specification (e.g., IBOC, Eureka-147) and then transmits the modulated combined programs as signal 118 to receiver 120.

Receiver 120 receives signal 118, demodulates the received signal, and then decodes the real-time primary and/or ancillary program information. Receiver 120 may then only process the real-time primary program component (e.g., immediately output the real-time primary audio program over a speaker) or may act only as a data receiver and only store or otherwise process (e.g., display streaming stock ticker information) the ancillary program information. In some instances receiver 120 may contemporaneously process both the primary and ancillary programs.

Figure 2:
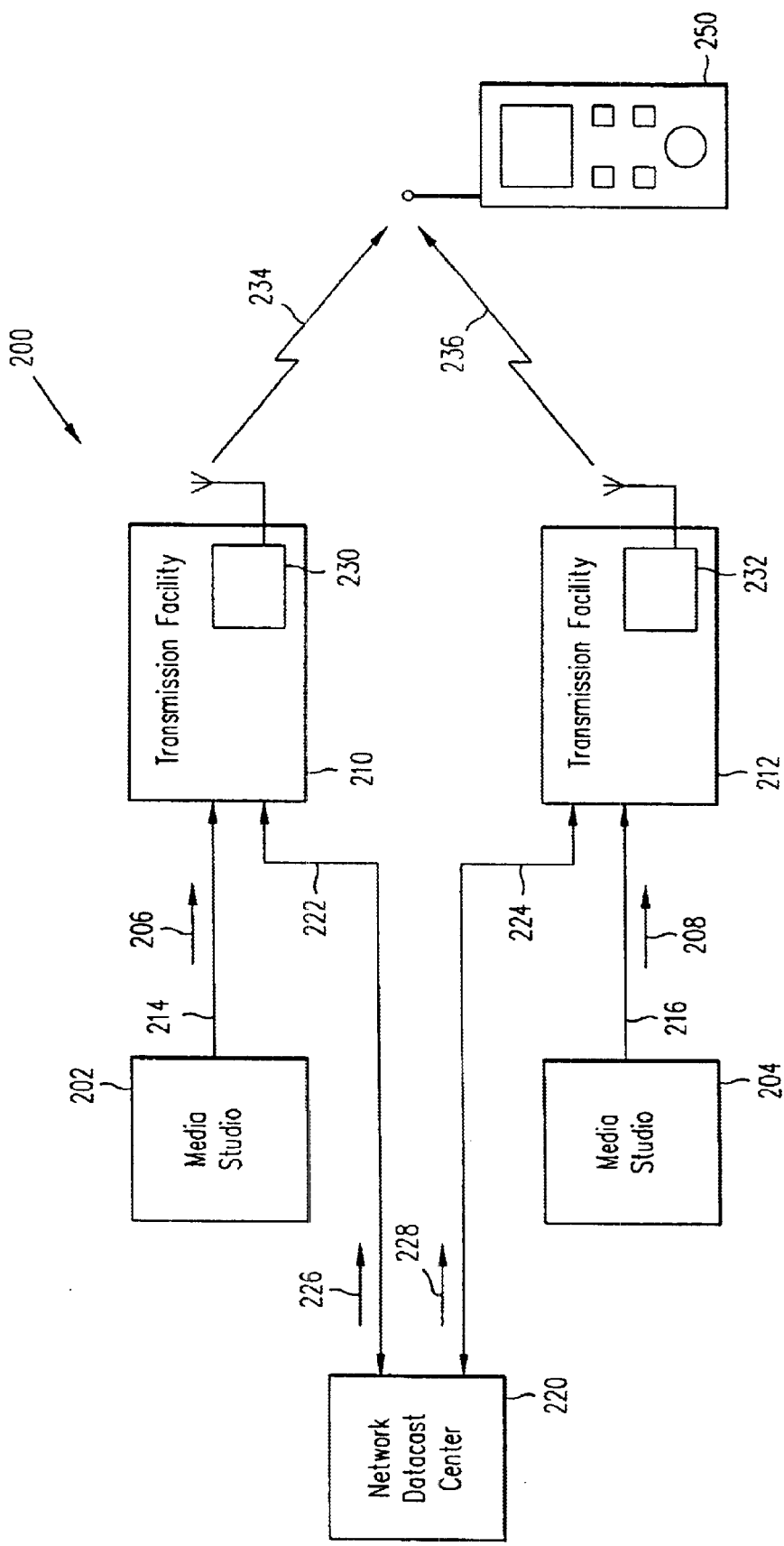
FIG. 2 is a diagrammatic illustration of a network datacast system.

FIG. 2 is a diagrammatic illustration of a network datacast system 200 in accordance with an embodiment of the invention. Media studios 202, 204 function similarly to studio 102 (FIG. 1). Studios 202, 204 provide real-time primary programs 206, 208, respectively, to transmission facilities 210, 212, respectively. Telecommunications links between studio 202 and facility 210, and between studio 204 and facility 212, are, for example, leased conventional telecommunications lines 214, 216, respectively. As illustrated in FIG. 2, each media studio and transmission facility pair 202–210 and 204–212 is controlled by a unique commercial entity such as a commercial AM or FM radio station. Transmission facilities 210, 212 (or at least the transmission facility antennas) are, in some embodiments, located at or near the same geographic position so that transmission signal coverage for each facility is approximately the same. The number of facilities 210, 212 shown is illustrative and some embodiments include many more transmission facilities. For example, for embodiments in which the transmission facilities are commercial FM stations, persons familiar with cross channel interference and United States FCC separation requirements will understand that up to 140 transmission facilities (i.e., station channels) may be present in a given geographic area (information distribution service market). The number of transmission facilities used is generally dependent on the receiver's ability to demodulate multiple signals, as described below.

Network datacast center 220 provides ancillary programs to each of the transmission facilities. As shown in FIG. 2, datacast center 220 is coupled to facilities 210, 212 via conventional leased telecommunications links 222, 224, respectively. Thus datacast center 220 contemporaneously provides ancillary programs 226 to facility 210 and ancillary programs 228 to facility 212. Ancillary data programs are, as described above, discrete media objects in digital format, such as stock ticker information, audio news programs, video news programs, text email between two entities, paging messages, audio and video streams, etc. In the case of streaming information (e.g., audio, video, stock ticker program) playback of the received program begins as the program is being received.

The datacast output capacity of network datacast center 220 within a given market is limited to the maximum ancillary data channel capacity supported by the aggregate of the ancillary data channel capacities of transmission facilities 210, 212 within that market. In the United States, the number of transmission facilities (e.g., commercial radio or television stations) in a geographic service area (market, e.g., Denver, Phoenix) is limited by the FCC. In some instances a unique datacast center serves only one market. In other instances a datacast center serves multiple markets, in which case the datacast center accommodates the aggregate ancillary data channel capacities for each market served. As discussed above, the ancillary data channel capacity of each unique transmission facility is determined by the controlling entity (e.g., commercial operator), and may in some instances dynamically vary. Accordingly, in some embodiments the datacasting output capacity of network datacast center 220 in information delivery system 200 varies by time and/or service area (market).

Transmission facility 210 conventionally combines and encodes for signal transmission (e.g., frames digital information) programs 206, 226. In some embodiments facility 210 conventionally applies forward error correction, compression, and/or encryption to either or both programs 206, 226. In other embodiments, forward error correction, compression, and/or encryption occurs in datacast center 220. Transmission facility 210 includes conventional transmitter 230 which modulates the combined and encoded programs 206, 226 according to a particular broadcast specification (e.g., IBOC, hybrid IBOC, XM or Sirius SDAR) and broadcasts the modulated radio signal 234. Transmission facility 212 performs similar processes on programs 208, 228 and conventional transmitter 232 broadcasts the modulated radio signal 236. (The satellites and associated ground link facilities are not shown here.)

Receiver 250 receives signals 234, 236, demodulates the received signals, and contemporaneously decodes (extracts) the ancillary program portion of each of signals 234, 236. Receiver 250 then processes the decoded ancillary programs as described in detail below. In some embodiments receiver 250 contemporaneously receives and extracts one or more of the primary programs contemporaneously with extracting the ancillary programs.

Figure 3:
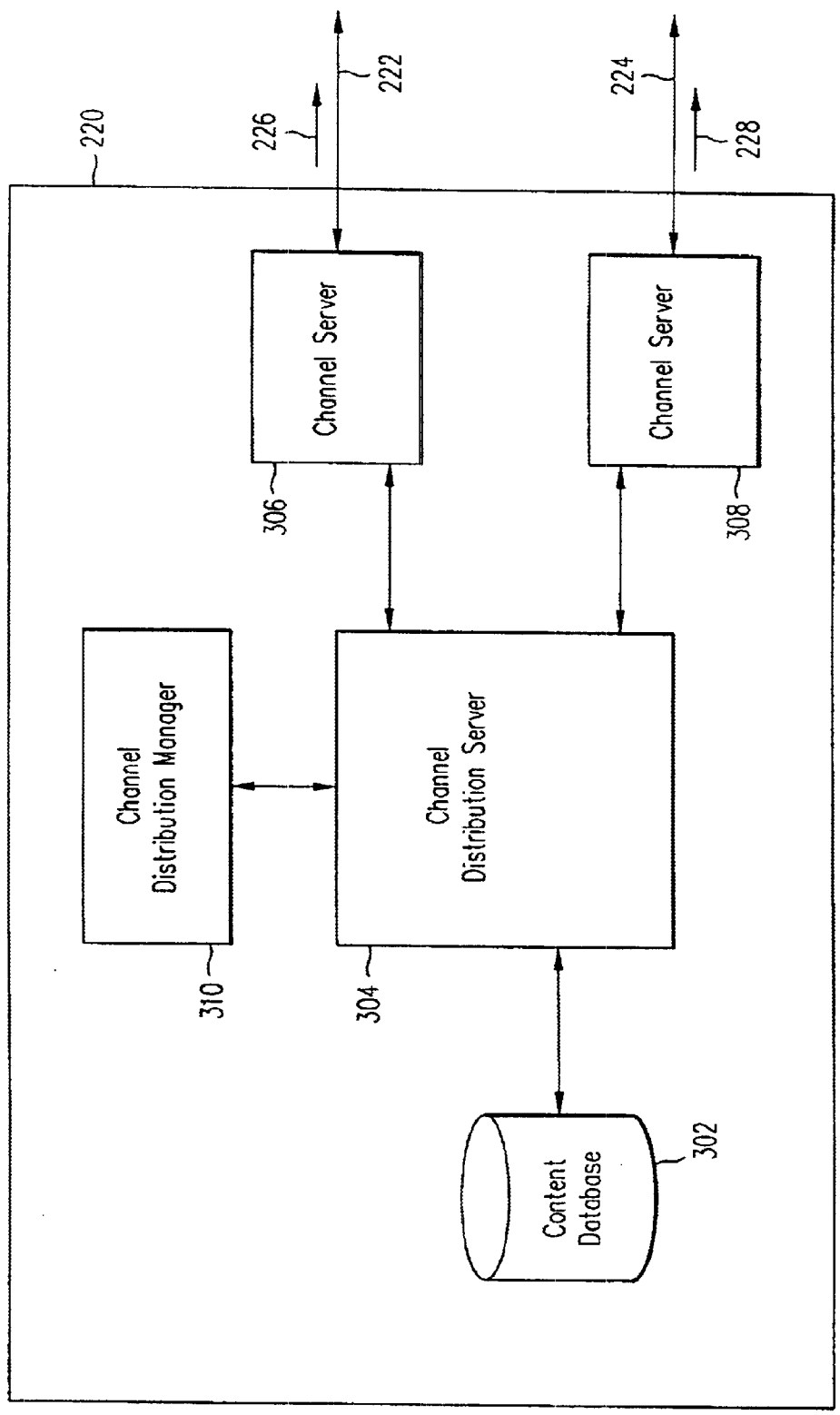
FIG. 3 is a diagrammatic illustration of a network datacast center.

FIG. 3 is a diagrammatic illustration of a network datacast center 220 in accordance with an embodiment of the invention. Each unique ancillary program datacast telecommunications link between datacast center 220 and a transmission facility (FIG. 2) is considered an output channel.

As shown in FIG. 3, content database 302 (typically resident in a conventional computer platform) contains information (content) formatted in various media types (e.g., audio protocol, video protocol, text protocol, binary codes, or combinations thereof) and divided into discrete media objects (programs, e.g., ABC News audio program, CNBC video program, stock ticker program, text email between two persons, a paging message, software (e.g., used for datacast network receiver operation), geographic map information, advertising, receiver operating configuration parameters). In one embodiment, each unique stored program is assigned a unique program identifier (e.g., number) that is used to identify the program. Program content is conventionally provided to database 302 by one or more conventional content providers (not shown). Some unique programs that are time-sensitive (e.g., news, financial information) may be updated one or more times in database 302. Outdated programs are conventionally removed from database 302.

Channel distribution server 304 ("server" here means conventional server software) accesses programs stored in database 302 and directs the accessed programs through an available output channel to a transmission facility. Channel distribution server 304 is coupled to channel servers 306, 308. Each channel server is in communication with a unique transmission facility. As shown in FIG. 3, for example, channel server 306 communicates with transmission facility 210 (FIG. 2) and channel server 308 communicates with transmission facility 212 (FIG. 2). In some embodiments channel distribution server 304 and each unique channel server 306, 308 are resident on separate computer platforms, each coupled to distribution server 304 using a conventional communications protocol. In other embodiments the channel distribution server and channel server functions are all resident on a single computer platform. Each channel server 306, 308 provides media objects in the required broadcast format to transmission facilities 210, 212, respectively. In one instance, for example, transmission facility 210 requires data to be in a particular packet format (i.e., fixed data length and associated header) and channel server 306 places the media object in the particular packet format, adding required packet header information such as the program identifier and program size.

Channel distribution manager 310 is additional software that defines for the datacasting network the number of available ancillary data channels and the datacasting capacity of each available channel. In one embodiment, distribution manager 310 is a lookup table in which a human network administrator registers available channel servers and the datacasting capacity of each server. In one instance this registration information includes information about how the datacasting capacity of the registered channel server varies, e.g., by time of day or day of week. In another embodiment distribution manager 310 includes information that is dynamically updated. In this dynamically updated embodiment, distribution server 304 receives from channel servers 306, 308 information regarding their availability and available ancillary data channel bandwidth (channel servers 306, 308 having previously received ancillary data channel bandwidth availability information from their respective transmission facilities). In some cases channel servers 306, 308 automatically send this ancillary data channel bandwidth availability information to distribution server 304. In other cases distribution server 304 periodically polls channel servers 306, 308 to determine availability information. In either the automatic or periodic polling cases, the availability information is used to dynamically update distribution manager 310.

Figure 4:
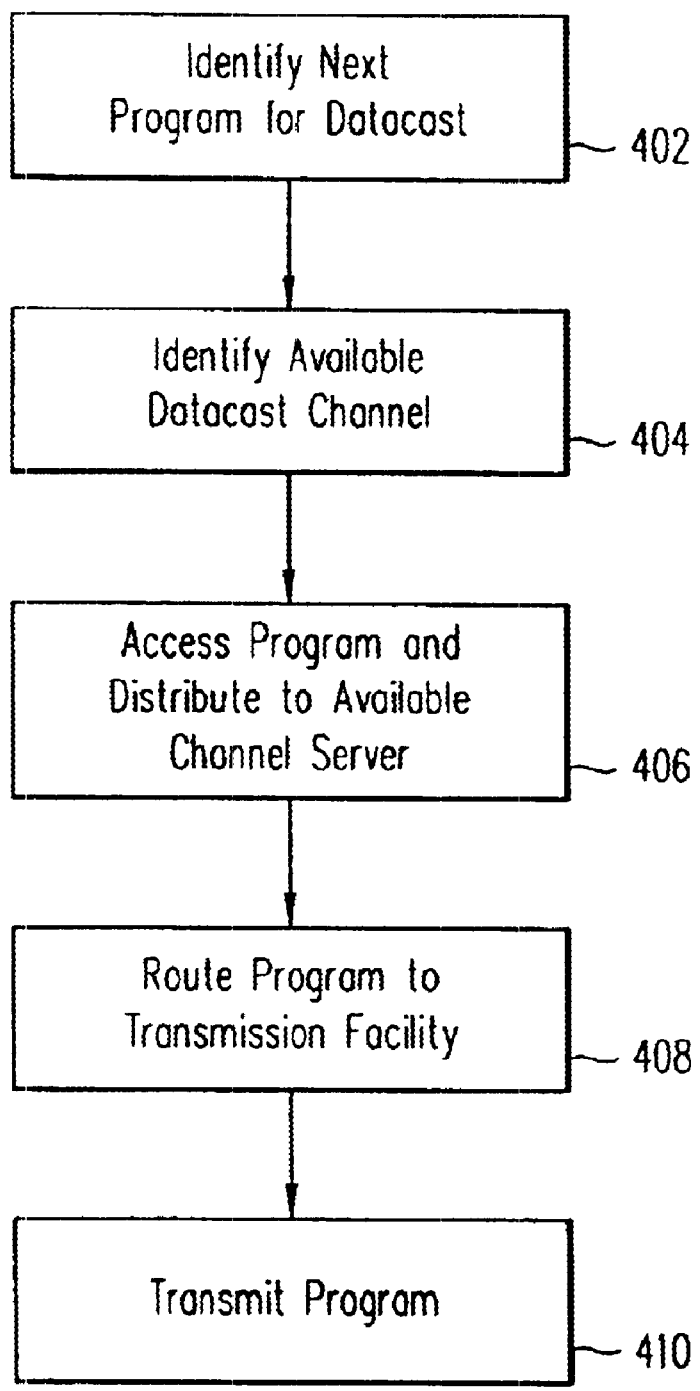
FIG. 4 illustrates a datacasting process.

FIG. 4 illustrates a datacasting process in accordance with the invention. In 402 channel distribution server 304 identifies for datacasting an ancillary program stored in database 302. In one instance the program is identified based on a preselected datacast schedule stored, for example, in server 304. In 404 channel distribution server 304 identifies an available ancillary data channel from among all ancillary data channels in the transmission facilities. In 406 channel distribution server 304 accesses the ancillary program identified in 402 and distributes the accessed program to the channel server associated with the available channel identified in 404. In 408 the identified channel server sends the accessed program to its associated transmission facility and, in 410, the transmission facility encodes and broadcasts the ancillary program as a radio (wireless) signal. Coding the software shown in FIG. 3 to carry out the FIG. 4 process and to operate datacast center 220 and transmission facilities 210, 212 is readily accomplished in light of this disclosure.

The time required to datacast a particular program varies according to the size of the program (e.g. 200 megabytes) and the channel data capacity (e.g. 10 kilobytes per second). Thus, the time required for a channel server to complete pass through of a particular ancillary program varies with each program.

In some embodiments channel distribution server 304 provides increased ancillary program throughput for a constant aggregate ancillary data channel bandwidth. Referring again to FIG. 3, rather than distributing an accessed program to the first available channel server, distribution manager 304 evaluates the relative size (e.g., number of bits) of the accessed program and distributes the accessed program according to the channel server bandwidth. For example, channel server 306 may service an associated transmission facility with a relatively high ancillary data channel bandwidth, whereas channel server 308 may service an associated transmission facility with a relatively low ancillary data channel bandwidth. To increase ancillary program throughput, distribution server 304 distributes relatively small accessed programs to channel server 306, thereby increasing the number of programs that are datacast. Distribution server 304 distributes relatively large accessed programs to channel server 308.

Persons skilled in the art will recognize that there are alternative methods of processing programs among multiple channel servers. In some embodiments, for example, several programs are interleaved by a channel server. In some embodiments a single program is separated into parts and each part is processed by a distinct channel server. In each of these embodiments receiver 250 is configured to accommodate the received ancillary data channel signal structures and to extract and reconstruct the ancillary programs for eventual output to the receiver user.

Figure 5:
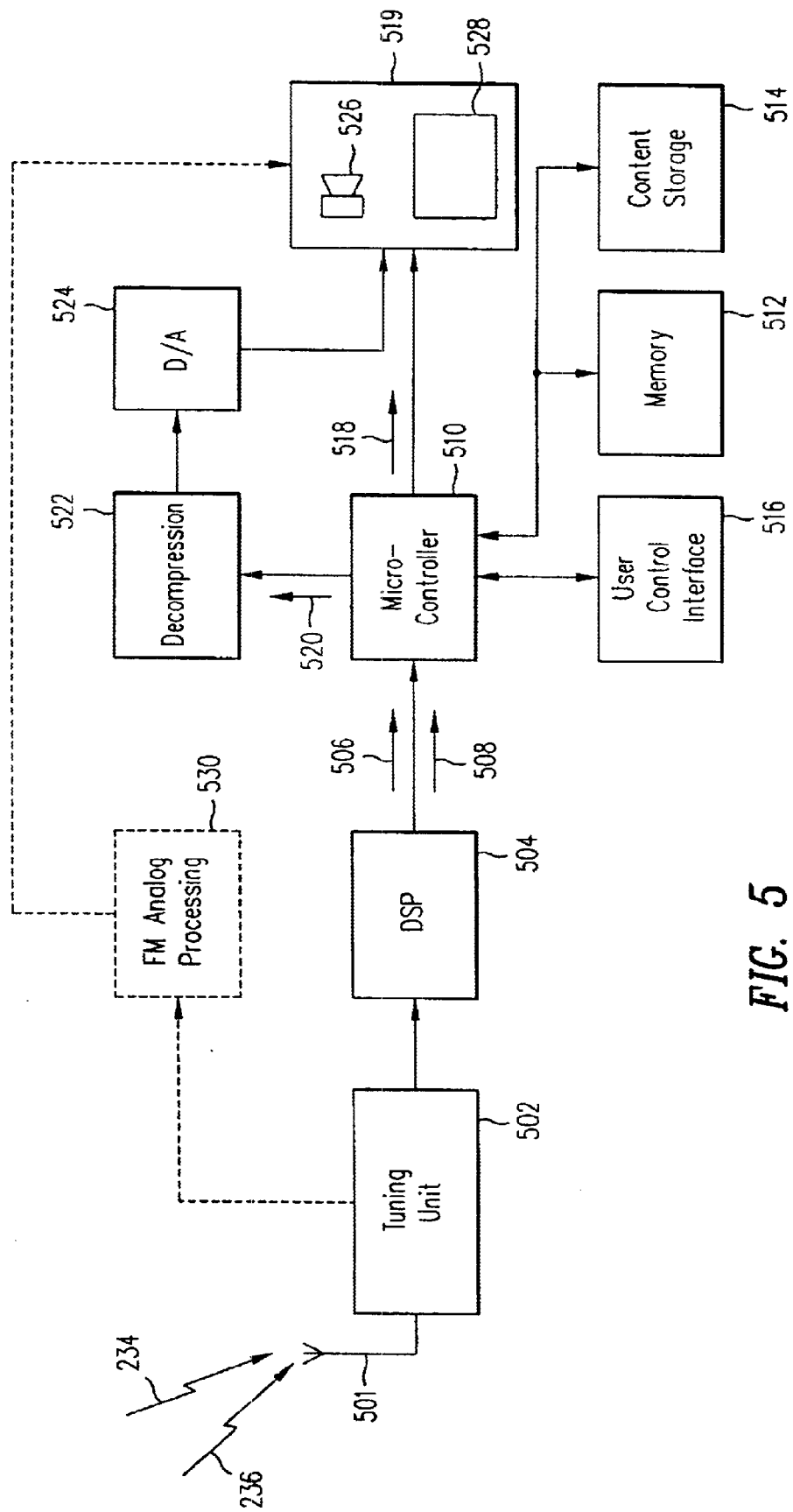
FIG. 5 is a diagrammatic illustration of a network datacast radio receiver.

FIG. 5 is a diagrammatic illustration of an embodiment of a network datacast radio receiver in accordance with the invention. This is a modified receiver of the type shown in FIG. 1. Tuning unit 502 receives multiple radio (wireless; "radio" here including television) signals that include both real-time and ancillary program content (e.g., signals 234, 236) and conventionally demodulates the received signals. Antenna 501 is suitable for receipt of the frequency spectrum that includes the signals of interest (e.g., an FM IBOC antenna). There are several embodiments of tuning unit 502 shown here.

Figure 6:
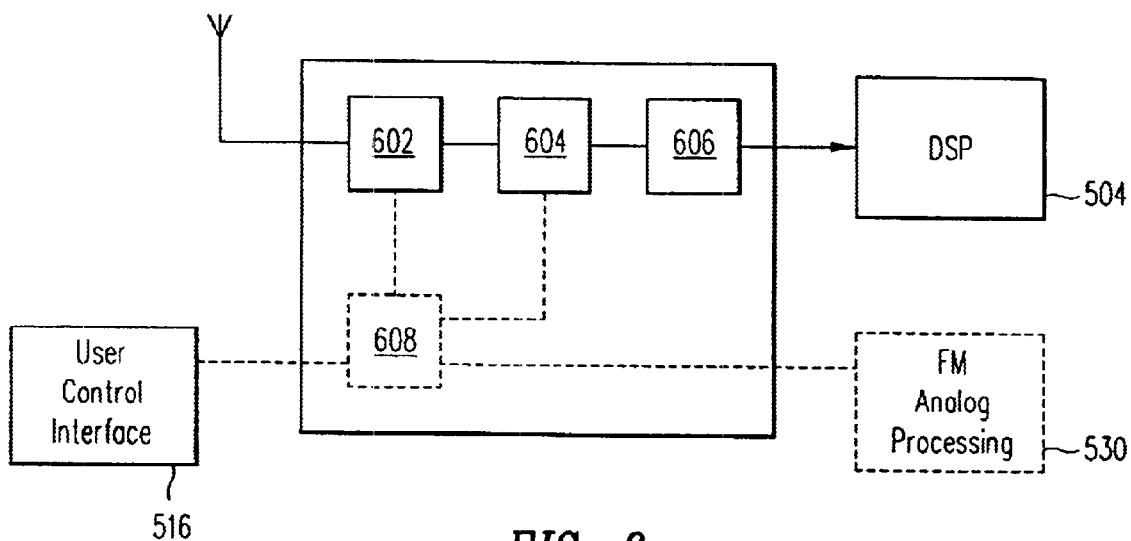
FIG. 6 is a diagrammatic view of a tuning unit.

As shown in FIG. 6, one embodiment of tuning unit 502 includes radio frequency (RF) down converter 602, analog to digital (A/D) converter 604 coupled to RF down converter 602, and multi-channel digital down converter 606 coupled to A/D converter 604. RF downconverter 602 converts the received frequency range of interest (e.g., commercial FM 88.0 MHz to 107.9 MHz) to a lower frequency range. A/D converter 604 then receives and converts the downconverted signals from analog to digital form. Persons familiar with radio receiving systems will understand that several conventional components (e.g., conventional band filters to eliminate unwanted signals outside the desired range or between specific station frequencies) have been omitted from the drawings to more clearly illustrate embodiments of the invention. A/D converter 604 outputs the digitized signals to decimating tuner 606 that parses each of the received ancillary data channels from the downconverted and digitized signal. In one embodiment decimating tuner 606 is an integrated circuit that functions similarly to Multi-Standard Quad Digital Down Converter (DDC) GC4014, available from Graychip, Inc., Palo Alto, Calif., although modified to operate at the frequency of interest. Converter 606 outputs the parsed channels in parallel to digital signal processor (DSP) 504. In one embodiment as illustrated by FIG. 6, DSP 504 is Texas Instruments part no. TMS320C6711.

Figure 7:
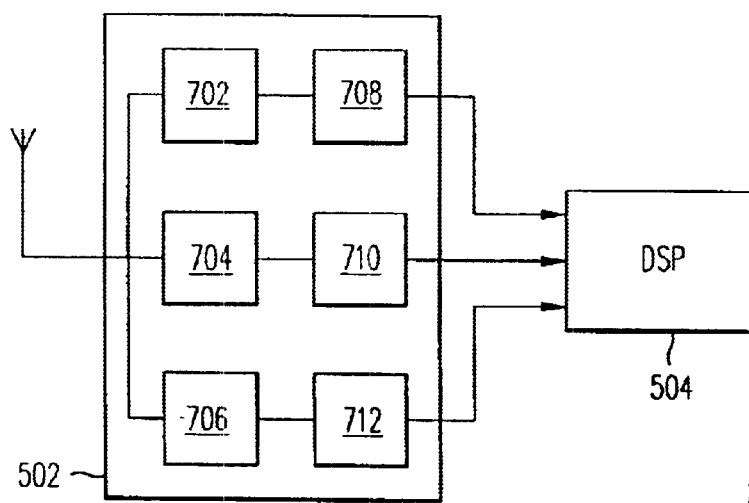
FIG. 7 is a diagrammatic view of a second tuning unit.

FIG. 7 illustrates another embodiment of tuning unit 502 that includes multiple tuners 702, 704, 706 (e.g., commercial FM tuners such as Philips Semiconductors part no. TEA5757; the number of tuners shown is illustrative), each unique tuner tuning to a unique ancillary data channel frequency received via the antenna. As depicted in FIG. 7, tuners 702, 704, 706 output their respective demodulated datacast signals to A/D converters 708, 710, 712 which, in turn, output their respective digitized output signals to DSP 504. In one embodiment as illustrated by FIG. 7, DSP 504 is Texas Instruments part no. TMS320C6711.

Figure 8:
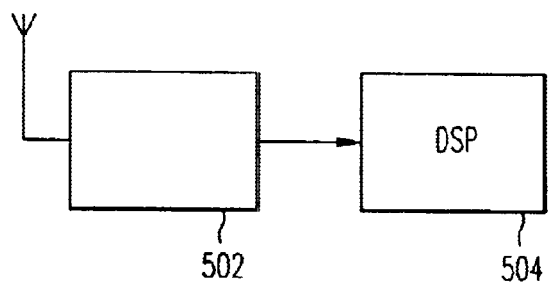
FIG. 8 is a diagrammatic view of a third tuning unit.

FIG. 8 illustrates yet another embodiment of tuning unit 502 in which a broad frequency spectrum signal (e.g., 88.0–107.9 MHz) is received, demodulated, digitized, and output to DSP 504. An example of such a broad spectrum tuning unit is one used in the Eureka-147 system, modified to work in the frequency range of interest. In one embodiment as illustrated by FIG. 8, DSP 504 is Texas Instruments part no. TMS320C6711.

Referring again to FIG. 5, digital signal processor 504 is coupled to tuning unit 502 and receives the demodulated signal or signals. In one embodiment DSP 504 decodes (extracts) both one or more real-time primary programs 506 (e.g., programs produced by one or more media studios (FIG. 2)) and all received ancillary programs 508. DSP 504 outputs the extracted programs 506, 508 to conventional microprocessor/microcontroller 510 (e.g., Samsung Electronics, Inc., part no. KS32C6200).

Microprocessor/microcontroller (the terms are equivalent for embodiments of this invention) 510 is conventionally controlled by coded instructions stored in memory 512. These coded instructions may be software, firmware, or hardware, or combinations thereof. In one embodiment microcontroller 510 stores the received ancillary programs 508 in content storage 514 (e.g., NVRAM, disk) as a database for subsequent access by the user.

Some programs are stored in a compressed format whereas other programs are not compressed. Microcontroller 510 further identifies each stored program using, for example, the stored program identifier, and makes available to the receiver user one or more menus of selections, each selection being associated with a unique stored program. For example, in one instance menu selections show the conventional text subject headers of stored conventional email programs. The menu selections are output to the user via user control interface 516 as, for example, a visual display or audio output. The user selects a program for output by, for example, pressing a button or inputting a voice command. Interface 516 relays the user command to microcontroller 510 which accesses the stored program for subsequent output.

In some instances microcontroller 510 routes programs 518 (e.g., text, graphics) accessed from storage 514 directly for output to the user via output unit 519. In other instances microcontroller 510 routes other programs 520 (e.g., audio, video) to conventional decompression unit 522 which decompresses the programs. Conventional digital to analog (D/A) converter 524 receives the decompressed program from unit 522 and converts the received program to analog form for output to the user via, for example, conventional speaker 526 or conventional visual display 528 included in output unit 519.

In some embodiments programs 508 (e.g., stock ticker service programs) are not stored but instead are output to the user upon receipt. Microcontroller 510 identifies such programs by the program identifier stored, for example, in packet or frame headers. In other embodiments, one or more ancillary data channels are reserved for data intended for immediate output to the user.

In the case of streaming information (e.g., audio or video program) output of the received program begins as the program is being received. Microcontroller 510 conventionally determines the incoming data rate of the datacast channel carrying the streaming program. If the data rate of the received datacast media object is faster than real-time, microcontroller 510 buffers portions of the received object for output to the user. If the data rate of the received datacast media object is slower than real time, the object includes information designating the size (i.e., duration) of the object. Microcontroller 510 then calculates the amount of received object buffering that is required and then buffers this initial amount of the received object before playback begins so as to present the received media object as continuous output to the user.

FIG. 5 further illustrates an alternate embodiment suitable for use with, for example, a hybrid IBOC system. In this alternate embodiment, a conventional FM analog signal is routed from tuning unit 502 (e.g., from the output of RF down converter 602 (FIG. 6) to conventional FM analog processing unit 530 in response to an input on interface 516 by the user. Referring to FIG. 6, interface 516 controls an electronic switch 608 that routes the output of down converter 602 to either or both DSP 504 and analog processing unit 530. The demodulated analog FM signal is output from processing unit 530 to speaker 526. FM radio signal processing as depicted in FIGS. 5 and 6 is illustrative and in other embodiments other analog signals (e.g., AM radio, analog television) are processed for output to the user contemporaneously with the receipt of the datacast program.

Figure 9:
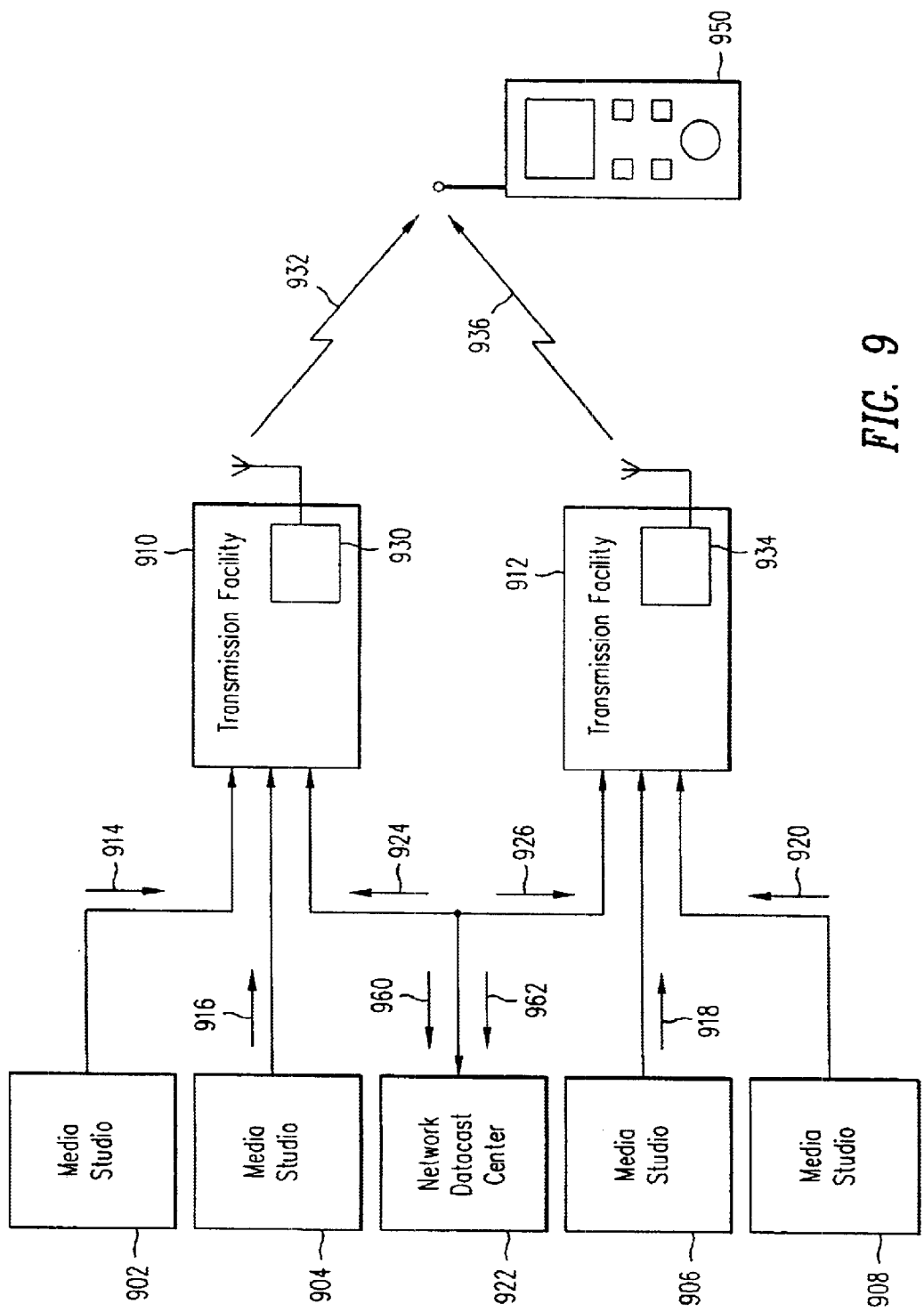
FIG. 9 is a diagrammatic view of a second network datacast system.

FIG. 9 is a diagrammatic illustration of a system embodiment adapted for use with multiple media studios feeding primary programs to multiple transmission facilities. Media studios 902, 904, 906, 908 function similarly to studios 202, 204 (FIG. 2). Transmission facilities 910, 912 function similarly to facilities 210, 212 (FIG. 2). Studios 902, 904 pass real-time primary programs 914, 916 respectively to transmission facility 910 and studios 906, 908 pass real-time primary programs 918, 920 respectively to transmission facility 912.

Network datacast center 922 functions similarly to datacast center 220 (FIG. 2) and passes ancillary programs 924, 926 to transmission facilities 910, 912 respectively. The communication between transmission facilities 910, 912 and the channel servers (not shown) and distribution server (not shown) in datacast center 922 is as described above with reference to FIGS. 2 and 3.

In some embodiments transmission facilities 910, 912 are each associated with a separate proprietary satellite digital audio radio systems (e.g., 910: XM Satellite Radio, Inc.; 912: Sirius Satellite Radio, Inc.). In these satellite embodiments media studios 902, 904, 906, 908 each feed primary programs to a unique primary channel in a broadcast channel of the satellite radio systems, each primary channel thereby being associated with a particular studio. Datacast center 922 feeds ancillary programs to the ancillary data channels available in the multiple broadcast channels in each of the two satellite systems.

In other embodiments transmission facilities 910, 912 are each associated with multiplexed terrestrial radio systems in which each multiplex carries an ensemble of channels (carriers) that include primary and ancillary programs (e.g., European Telecommunications Standards Institute (ETSI) Eureka-147 standard). Persons familiar with multiplexed radio transmissions systems will understand that a broad radio frequency spectrum is allocated for transmission of an ensemble multiplex radio signal wherein each unique broadcast service originates at a corresponding unique data source (media studio). In the Eureka-147 system, for example, the multiplexed signals are broadcast as a single coded orthogonal frequency division multiplexing (COFDM) signal. The corresponding receiver tunes to the broadcast COFDM signal and extracts information originating from a particular data source.

In accordance with the multiplex signal embodiments of this invention, media studios 902, 904, 906, 908 each feed primary programs to a unique multiplex channel associated with each studio. Datacast center 922 feeds ancillary programs to the ancillary data channels available in each of the two ensemble multiplex signal systems. Transmission facility 910 receives programs 914, 916, 924 and conventionally modulates (e.g., using COFDM) the received programs. Transmitter 930 in facility 910 then conventionally broadcasts the multiplexed programs as ensemble multiplex radio signal 932. Likewise, transmission facility 912 receives programs 918, 920, 926 and conventionally modulates (e.g., using COFDM) the received programs. Transmitter 934 in facility 912 conventionally broadcasts the multiplexed programs as ensemble multiplex radio signal 936 contemporaneously with the transmission of signal 932. Receiver 950 contemporaneously receives signals 932, 936 using, for example, the tuner 502 embodiment described above in relation to FIG. 8, and subsequently processes the contemporaneously received aggregate ancillary data channel information as described above (e.g., stores ancillary programs for subsequent output or initiates streaming output).

In some embodiments bandwidth availability information 960, 962 is transmitted from facilities 910, 912 respectively to datacast center 922. Information 960, 962 includes, for example, the available ancillary data channel bandwidth for datacast center 922 to use in determining if facilities 910, 912 are ready to receive ancillary programs 924, 926 respectively.

Embodiments of the invention allow high aggregate ancillary data channel bandwidth. For example, in the U.S. commercial FM radio spectrum (88.0–107.9 MHz) there are 140 possible FCC licensed FM frequencies in a given geographic area. In practice, the FCC limits station coverage due to interference problems between adjacent stations. A U.S. commercial FM radio station based datacast network in accordance with this invention has an aggregate ancillary data channel bandwidth up to 100 times that of an individual FM station. In Hybrid IBOC embodiments, for example, if each of 100 independent commercial FM stations reserves 6–10 KBps in the ancillary data channel, the network datacast transmission system and associated receiver would be capable of processing 100 times that of a single station or 600–1,000 KBps. A fully Digital IBOC datacast network is capable of similar multiples in ancillary data channel capacity.

Embodiments of the invention are not limited to networking within a single transmission modulation method. Referring to FIG. 2, for example, in one embodiment transmission facility 210 is a commercial FM radio station and transmission facility 212 is a commercial AM radio station. The receiver for this embodiment contemporaneously demodulates the differently modulated signals. As shown in FIG. 7, for example, tuner-A/D converter pair 702–708 receives and converts the FM signal and tuner-A/D converter pair 704–710 receives and converts the AM signal. Other embodiments mix other well-known modulation methods such as phase modulation.

Further, embodiments of the invention are not limited to networking within a single broadcast format. In one embodiment, illustrated by FIG. 2, transmission facility 210 is a terrestrial commercial FM radio station and transmission facility 212 is associated with a commercial satellite digital audio radio system (the satellite that transmits signal 236 is not shown). Other embodiments use combinations of other digital transmission facilities such as digital television stations.

In some embodiments the number of coordinated transmission facilities in the datacast network varies by geographic coverage area of ancillary data channels or by time within a particular geographic coverage area of ancillary data channels. In these embodiments, each digital radio frequency broadcast channel carrying network datacast information is encoded with an identifier (signature; e.g., a number) that enables the network receiver to detect the presence or absence of an ancillary data channel signal carried by that broadcast channel.

Figure 10:
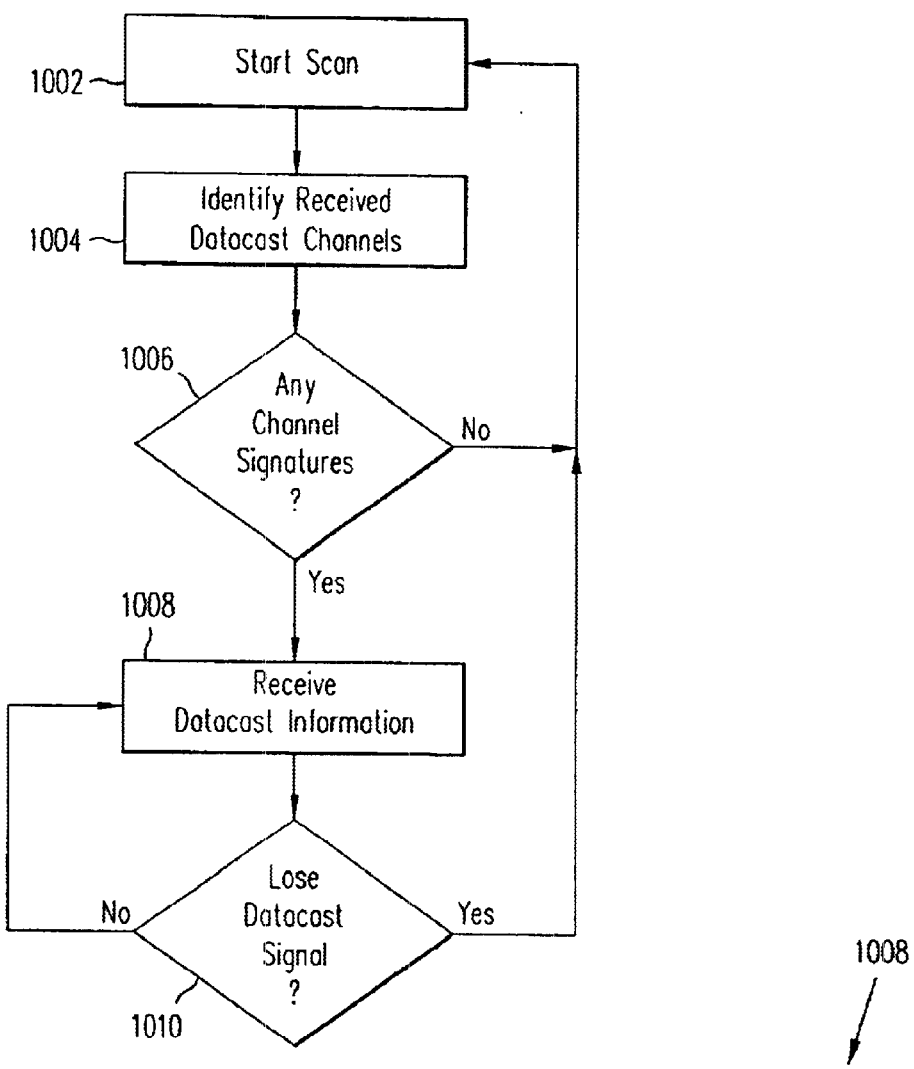
FIG. 10 illustrates a process performed by a network datacast receiver.

FIG. 10 illustrates the process performed by the receiver (e.g., 250, 950 (FIGS. 2, 9)) for embodiments in which the ancillary data channels include channel identifiers. In 1002 the receiver (i.e., coded logic executed by a microprocessor/microcontroller within the receiver) begins to scan the frequency range of interest in which the expected ancillary data channels are to be received. In some embodiments the scan is initiated at receiver power-on and by 1010 described below. In other embodiments the scan begins at particular predetermined times or time intervals. In 1004 the receiver identifies the identifier (e.g., information carried in a frame header) associated with received ancillary data channels. In 1006 the receiver determines if any ancillary data channel identifiers have been received during the preceding scan. If yes, the receiver continues to 1008. If not, for example when the receiver is moving between two geographic market areas (e.g., Denver, Phoenix) the receiver returns to 1002 and begins to scan for ancillary data channels again. In 1008 the receiver begins to receive ancillary programs via the channels identified in 1004. Contemporaneous reception in 1008 of ancillary programs via multiple ancillary data channels is as described above. In 1010 the receiver periodically checks to see if all received ancillary data channels have dropped below a received power threshold (loses the channel) and, if so, returns to 1002.

Figure 11:
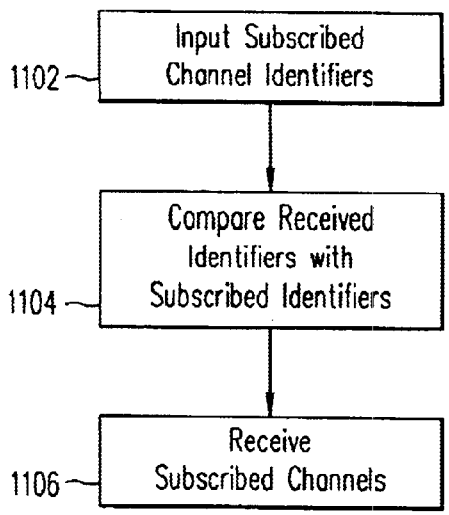
FIG. 11 illustrates a second process performed by a network datacast receiver.

FIG. 11 is illustrates an embodiment of the process of 1008 (FIG. 10) in more detail. In the embodiment depicted by FIG. 11, the receiver user subscribes to (e.g., pays to receive) only selected ones of available ancillary data channels. In 1102 the ancillary data channels to which the user subscribes are entered into a storage location (e.g., NVRAM) in the receiver. In some cases this data entry is performed at a point of sale for the receiver and in other cases is accomplished by sending the subscription information to the receiver over an ancillary data channel that does not require subscription. In 1104 the receiver compares received ancillary data channel identifiers with the table of subscribed datacast channel identifiers. In 1106 the receiver contemporaneously receives and extracts ancillary programs from the ancillary data channels to which the user subscribes, but does not extract ancillary programs from ancillary data channels to which the user does not subscribe.

Persons familiar with wireless transmission will understand that the embodiments discussed herein are illustrative and many variations exist. Software coding for embodiments in accordance with the invention is readily accomplished in light of this disclosure. The invention is therefore limited only by the following claims.

I claim:

1. A datacast transmission network comprising:
   a network datacast center including a content database, a channel distribution server coupled to the content database, and first and second ancillary data channel servers coupled to the channel distribution server;
   a first wireless transmission facility coupled to receive a first primary program from a first media studio and a second primary program from a second media studio, and to receive a first ancillary program from the first ancillary data channel server, wherein the first transmission facility transmits a first wireless signal including the first and second primary programs and the first ancillary program; and
   a second wireless transmission facility coupled to receive a third primary program from a third media studio and a fourth primary program from a fourth media studio, and to receive a second ancillary program from the second ancillary data channel server, wherein the second transmission facility transmits, contemporaneously with the first wireless signal, a second wireless signal including the third and fourth primary programs and the second ancillary program.

2. The network of claim 1, wherein the first wireless signal is a first satellite broadcast signal and the second wireless signal is a second satellite broadcast signal.

3. The network of claim 1, wherein the first wireless signal is a first ensemble multiplex signal and the second wireless signal is a second ensemble multiplex signal.

4. A datacast transmission network comprising:
   a network datacast center including a content database, a channel distribution server coupled to the content database, and first and second ancillary data channel servers coupled to the channel distribution server;
   a first wireless transmission facility coupled to receive a first primary program from a first media studio and to receive a first ancillary program from the first ancillary data channel server, wherein the first transmission facility transmits a first wireless signal including the first primary program and the first ancillary program; and
   a second wireless transmission facility coupled to receive a second primary program from a second media studio and to receive a second ancillary program from the second ancillary data channel server, wherein the second transmission facility transmits, contemporaneously with the first wireless signal, a second wireless signal including the second primary program and the second ancillary program.

5. The network of claim 4, wherein the first wireless signal is modulated using a first modulation method different from a second modulation method used to modulate the second wireless signal.

6. The network of claim 5, wherein the first modulation method is frequency modulation and the second modulation method is amplitude modulation.

7. The network of claim 4, wherein the first transmission facility transmits using a first broadcast format and the second transmission facility transmits using a second broadcast format different from the first broadcast format.

8. The network of claim 7, wherein the first broadcast format is a terrestrial broadcast system format and the second broadcast format is a satellite broadcast system format.

9. A datacast receiver comprising:
   a wireless signal tuning unit, the tuning unit being adapted to contemporaneously receive a first wireless signal including a first ancillary data channel and a second wireless signal including a second ancillary data channel;
   a digital signal processor coupled to receive from the tuning unit a first ancillary program extracted from the first ancillary data channel and a second ancillary program from the second ancillary data channel;

a microcontroller coupled to the digital signal processor;

a user control interface coupled to the microcontroller;

a content storage unit coupled to the microcontroller; and an output unit coupled to the microcontroller.

10. The receiver of claim 9, wherein the first wireless signal is a first satellite broadcast signal and the second signal is a second satellite broadcast signal.

11. The receiver of claim 9, wherein the first wireless signal is a first ensemble multiplex signal and the second wireless signal is a second ensemble multiplex signal.

12. The receiver of claim 9, wherein the tuning unit includes a first tuner receiving the first wireless signal and a second tuner receiving the second wireless signal, the first wireless signal being modulated using a first modulation method and the second wireless signal being modulated using a second modulation method, the first and second modulation methods being different.

13. The receiver of claim 12, wherein the first modulation method is frequency modulation and the second modulation method is amplitude modulation.

14. A method of transmitting data, comprising the acts of:

providing first and second ancillary programs in a database;

accessing the first and second ancillary programs;

passing the accessed first ancillary program to a first transmission facility and the accessed second ancillary program to a second transmission facility; and using the first transmission facility to transmit the first ancillary program in a first wireless ancillary data channel and contemporaneously using the second transmission facility to transmit the second ancillary program in a second wireless ancillary data channel.

15. The method of claim 14, further comprising:

providing first and second primary programs in the database;

accessing the first and second primary programs;

passing the accessed first primary program to the first transmission facility and the accessed second primary program to the second transmission facility; and using the first transmission facility to transmit the first primary program in a first primary channel and contemporaneously using the second transmission facility to transmit the second primary program in a second primary channel, the transmitting of the first and second primary programs being contemporaneous with the transmitting of the first and second ancillary programs.

16. The method of claim 14, wherein the first wireless ancillary data channel is included in a first single multiplex of a first ensemble multiplex wireless signal and the second wireless ancillary data channel is included in a second single multiplex of a second ensemble multiplex wireless signal.

17. The method of claim 14, further comprising:

using a first modulation method to modulate a first wireless signal carrying the first ancillary program; and using a second modulation method, different from the first modulation method, to modulate a second wireless signal carrying the second ancillary program.

18. The method of claim 14, wherein the first transmission facility is associated with a satellite wireless transmission system and the second transmission facility is associated with a terrestrial wireless transmission system.

19. A method of receiving data, comprising the acts of:

tuning to a first wireless ancillary data channel and contemporaneously tuning to a second wireless ancillary data channel;

extracting a first ancillary program from the first ancillary data channel and contemporaneously extracting a second ancillary data program from the second datacast channel; and storing the first and second ancillary programs in a content storage positioned in a receiver.

20. The method of claim 19, further comprising:

receiving a first wireless signal carrying the first ancillary data channel, the first signal being modulated with a first modulation method; and receiving a second wireless datacast signal carrying the second ancillary data channel, the second signal being modulated with second modulation method different from the first modulation method.

21. The method of claim 19, wherein the first wireless ancillary data channel is included in a first single multiplex of a first ensemble multiplex wireless signal and the second wireless ancillary data channel is included in a second single multiplex of a second ensemble multiplex wireless signal.

22. The method of claim 19, wherein the first ancillary data channel is in a first broadcast format and the second ancillary data channel is in a second broadcast format different from the first broadcast format.

23. The method of claim 22, wherein the first broadcast format is a terrestrial broadcast system format and the second broadcast format is a satellite broadcast system format.

* * * * *